US011151359B2

(12) United States Patent
Hou et al.

(10) Patent No.: US 11,151,359 B2
(45) Date of Patent: Oct. 19, 2021

(54) FACE SWAP METHOD, FACE SWAP DEVICE, HOST TERMINAL AND AUDIENCE TERMINAL

(71) Applicant: JOYME PTE. LTD., Singapore (SG)

(72) Inventors: Wenpei Hou, Beijing (CN); He Li, Beijing (CN); Chenying Wang, Beijing (CN); Diqin Jiao, Beijing (CN); Huan Long, Beijing (CN)

(73) Assignee: JOYME PTE. LTD., Singapore (SG)

( * ) Notice: Subject to any disclaimer, the term of this patent is extended or adjusted under 35 U.S.C. 154(b) by 66 days.

(21) Appl. No.: 16/418,526

(22) Filed: May 21, 2019

(65) Prior Publication Data
US 2019/0392197 A1 Dec. 26, 2019

Related U.S. Application Data

(63) Continuation of application No. PCT/CN2017/107160, filed on Oct. 20, 2017.

(30) Foreign Application Priority Data

Nov. 22, 2016 (CN) .......................... 201611048349.8

(51) Int. Cl.
G06K 9/00 (2006.01)
G06F 3/0484 (2013.01)

(52) U.S. Cl.
CPC ....... G06K 9/00248 (2013.01); G06F 3/0484 (2013.01); G06K 9/00281 (2013.01); G06K 9/00295 (2013.01); G06K 9/00677 (2013.01)

(58) Field of Classification Search
None
See application file for complete search history.

(56) References Cited

U.S. PATENT DOCUMENTS

2014/0176662 A1* 6/2014 Goodman .............. H04N 7/141
348/14.07

FOREIGN PATENT DOCUMENTS

CN 102196245 A 9/2011
CN 104170374 A 11/2014
CN 106534757 A 3/2017

OTHER PUBLICATIONS

Office Action issued in corresponding Chinese Application No. 201611048349.8 dated Nov. 27, 2018, and English translation thereof (19 pages).
International Search Report issued in International Application No. PCT/CN2017/107160 dated Dec. 27, 2017 (2 pages).
Written Opinion issued in International Application No. PCT/CN2017/107160 dated Dec. 27, 2017 (4 pages).

* cited by examiner

Primary Examiner — Leon Flores
(74) Attorney, Agent, or Firm — Osha Bergman Watanabe & Burton LLP

(57) ABSTRACT

The present disclosure provides a face swap method, a face swap device, a host terminal and an audience terminal. The method includes: starting a face swap prompt; recognizing and determining a first face image in a first preset image of the host terminal according to the face swap prompt; receiving a second face image sent by the audience terminal; and replacing the first face image with the second face image to obtain a first face-swapped image.

15 Claims, 8 Drawing Sheets

FACE SWAP METHOD, FACE SWAP DEVICE, HOST TERMINAL AND AUDIENCE TERMINAL

CROSS-REFERENCE TO RELATED APPLICATIONS

This application is a continuation application of International Application No. PCT/CN2017/107160, filed on Oct. 20, 2017, which claims priority to and benefits of Chinese Patent Application Serial No. 201611048349.8, entitled as "FACE SWITCHING METHOD, DEVICE, ANCHOR TERMINAL AND AUDIENCE TERMINAL", and filed on Nov. 22, 2016 by BEIJING KINGSOFT INTERNET SECURITY SOFTWARE CO., LTD.

FIELD

The present disclosure relates to the field of communication technologies, and more particularly, to a face swap method, a face swap device, a host terminal, and an audience terminal.

BACKGROUND

With the development of network and computer technology, face swap has gradually become a new hotspot for people's social entertainment. A variety of applications with face swap functions have been developed, which brings pleasure to people's entertainment life.

In the related art, face recognition is usually performed on the face area in the still picture, the face area in the original image is mapped and placed in the target image, and then face fusion or naturalization processing is performed to make the image natural, thereby achieving face swap.

However, the above face swap manner can only be implemented in the same terminal, for example, the face in the image or the recorded video is swapped to the desired face, or the two faces in the same image is swapped, which has limitation and poor entertainment.

SUMMARY

Embodiments of the present disclosure provide a face swap method, which is applicable to a host terminal. The host terminal is connected to an audience terminal through a network. The method includes: starting a face swap prompt; recognizing and determining a first face image in a first preset image of the host terminal according to the face swap prompt; receiving a second face image sent by the audience terminal; and replacing the first face image with the second face image to obtain a first face-swapped image.

Embodiments of the present disclosure provide a face swap method, which is applicable to an audience terminal. The audience terminal is connected to a host terminal through a network. The method includes: starting a face swap prompt; recognizing and determining a second face image in a second preset image of the audience terminal according to the face swap prompt; sending the second face image to the host terminal, such that the host terminal replaces a first face image with the second face image to obtain a first face-swapped image; receiving the first face image sent by the host terminal; and replacing the second face image with the first face image to obtain a second face-swapped image.

Embodiments of the present disclosure provide a host terminal. The host terminal includes one or more of components a circuit board, a housing, a processor, a memory, a power supply circuit, a display screen, an audio component, an input/output (I/O) interface, a sensor component, and a communication component. The circuit board is arranged in a space enclosed by the housing, and the processor and the memory are positioned on the circuit board. The power supply circuit is configured to provide power for respective circuits or components of the host terminal. The memory is configured to store executable program codes. The processor is configured to run a program corresponding to the executable program codes by reading the executable program codes stored in the memory to perform the face swap method according to embodiments of the present disclosure.

Embodiments of the present disclosure provide an audience terminal. The audience terminal includes one or more of components a circuit board, a housing, a processor, a memory, a power supply circuit, a display screen, an audio component, an input/output (I/O) interface, a sensor component, and a communication component. The circuit board is arranged in a space enclosed by the housing, and the processor and the memory are positioned on the circuit board. The power supply circuit is configured to provide power for respective circuits or components of the host terminal. The memory is configured to store executable program codes. The processor is configured to run a program corresponding to the executable program codes by reading the executable program codes stored in the memory to perform the face swap method according to embodiments of the present disclosure.

Embodiments of the present disclosure provide a storage medium for storing executable program codes. When the executable program codes are executed, the face swap method according to embodiments of the present disclosure is implemented.

Embodiments of the present disclosure provide a storage medium for storing executable program codes. When the executable program codes are executed, the face swap method according to embodiments of the present disclosure is implemented.

Embodiments of the present disclosure provide an executable program code. When the executable program code is executed, the face swap method according to embodiments of the present disclosure is implemented.

Embodiments of the present disclosure provide an executable program code. When the executable program codes are executed, the face swap method according to embodiments of the present disclosure is implemented.

BRIEF DESCRIPTION OF THE DRAWINGS

In order to clearly illustrate embodiments of the present disclosure or technical solutions of related art, a brief description of drawings used in embodiments or the related art is given below. Obviously, the drawings in the following descriptions are only part embodiments of the present disclosure, and for those skilled in the art, other drawings can be obtained according to these drawings without creative labor.

DETAILED DESCRIPTION

Figure 1:
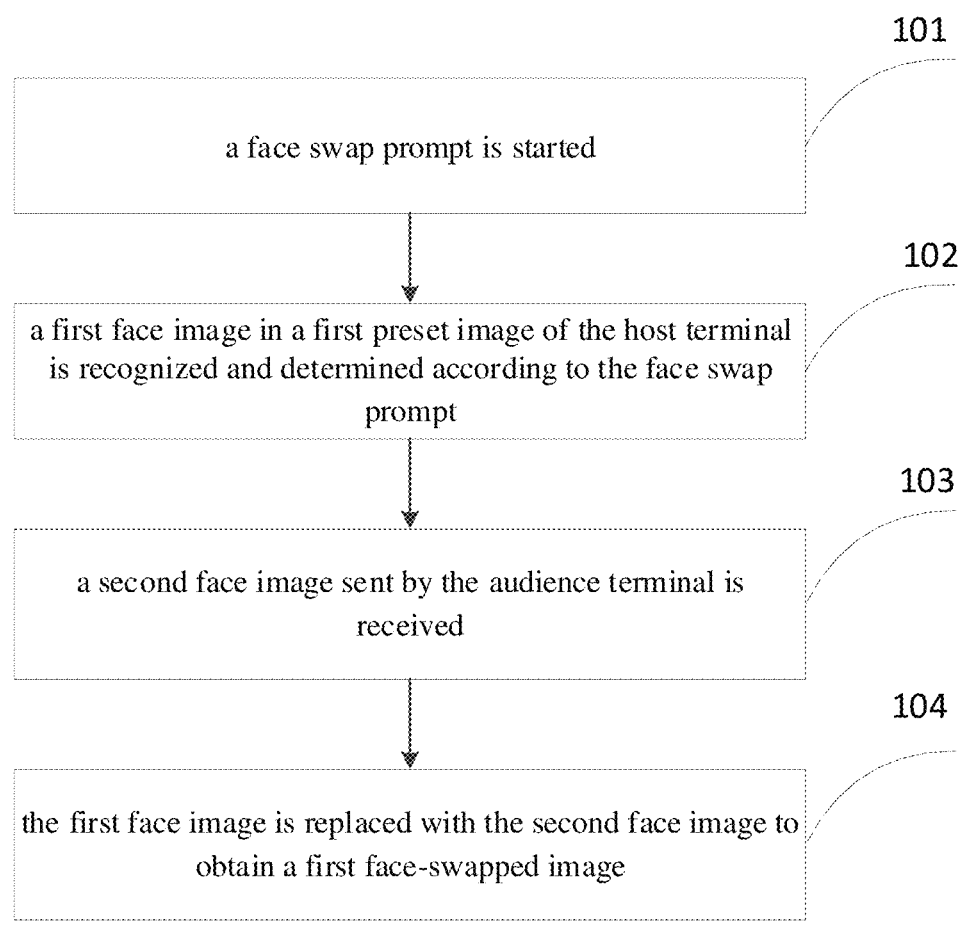
FIG. 1 is a flow chart of a face swap method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. Instead, they are merely examples of apparatuses and methods consistent with aspects related to the present disclosure as recited in the appended claims. Instead, they are merely examples of apparatuses and methods consistent with aspects related to the present disclosure as recited in the appended claims.

The face swap method, the face swap device, the host terminal, and the audience terminal according to embodiments of the present disclosure will be described below with reference to the accompanying drawings.

FIG. 1 is a flow chart of a face swap method according to an embodiment of the present disclosure.

As shown in FIG. 1, the method may include followings.

At block 101, a face swap prompt is started.

Specifically, the face swap method according to the embodiment of the present disclosure may be configured to be executed in a host terminal. The host terminal may be a mobile phone, a computer, or the like.

The face swap method in the related art can only be implemented in the same terminal, and has the problem of limitation and poor entertainment, thus embodiments of the present disclosure provide a face swap method, such that face swap can be realized in different terminals by interacting with the connected terminal.

In the embodiment of the present disclosure, the host terminal can be connected to the audience terminal through the network. Specifically, the host terminal may be connected to the audience terminal for video conversation, or the host terminal may be connected to the audience terminal for live broadcasting, or the like, which is not limited herein.

Specifically, the host terminal or the audience terminal can initiate the face swap request, and after the face swap request is agreed, the two parties can automatically start the face swap prompt. In other words, when the host terminal and the audience terminal are connected through the network, the host terminal may actively send the face swap request to the audience terminal, and directly start the face swap prompt after the response prompt returned by the audience terminal is received. Alternatively, the host terminal may receive the face swap request sent by the audience terminal, and start the face swap prompt after the response message is sent to the audience terminal.

It should be further noted that, in the process of the host terminal sending the face swap request to the audience terminal, before the response prompt returned by the audience terminal is received, the user may send an operation instruction to the host terminal to end the face swap operation at any time. Alternatively, after the face swap request sent by the audience terminal is received, the host terminal may not send the response message to the audience terminal, but send an end instruction to reject the face swap request of the audience terminal.

At block 102, a first face image in a first preset image of the host terminal is recognized and determined according to the face swap prompt.

The first preset image is the image required for face swap in the host terminal. Specifically, it may be the image obtained by the camera, or it may be the image stored in a local image library, which is not limited herein.

Accordingly, in the embodiment of the present disclosure, before the face swap prompt is started, the method further includes obtaining the first preset image by a camera, or obtaining the first preset image from a local image library.

At block 103, a second face image sent by the audience terminal is received.

At block 104, the first face image is replaced with the second face image to obtain a first face-swapped image.

In an implementation, after the second face image returned by the audience terminal is received, the host terminal may replace the first face image in the first preset image with the second face image to obtain the first face-swapped image. The specific face swap manner may be referred to the related art, and will not be described here.

It can be understood that, when two terminals are connected, for example, the two terminals are connected for video conversation, or the host terminal is connected to another terminal during live broadcast, before the face swap is performed, the first preset image in the host terminal may include the first face image, and the second preset image in the audience terminal may include the second face image. In the host terminal, only the first preset image may be displayed, or the first preset image and the second preset image may be simultaneously displayed. Then, in an embodiment of the present disclosure, before the face swap prompt is started, the method may further include obtaining a second preset image of the audience terminal, and displaying a combined image of the first preset image and the second preset image according to a first preset display strategy.

The first preset display strategy is configured to indicate the display manner of the first preset image and the second preset image. For example, the first preset image and the second preset image may be respectively displayed on the left and right sides or the upper and lower sides of the display screen in the same ratio, or the first preset image and the second preset image may be displayed in different ratios, or the second preset image may be displayed in a small window form at a position above the first preset image, or the like.

Figure 2:
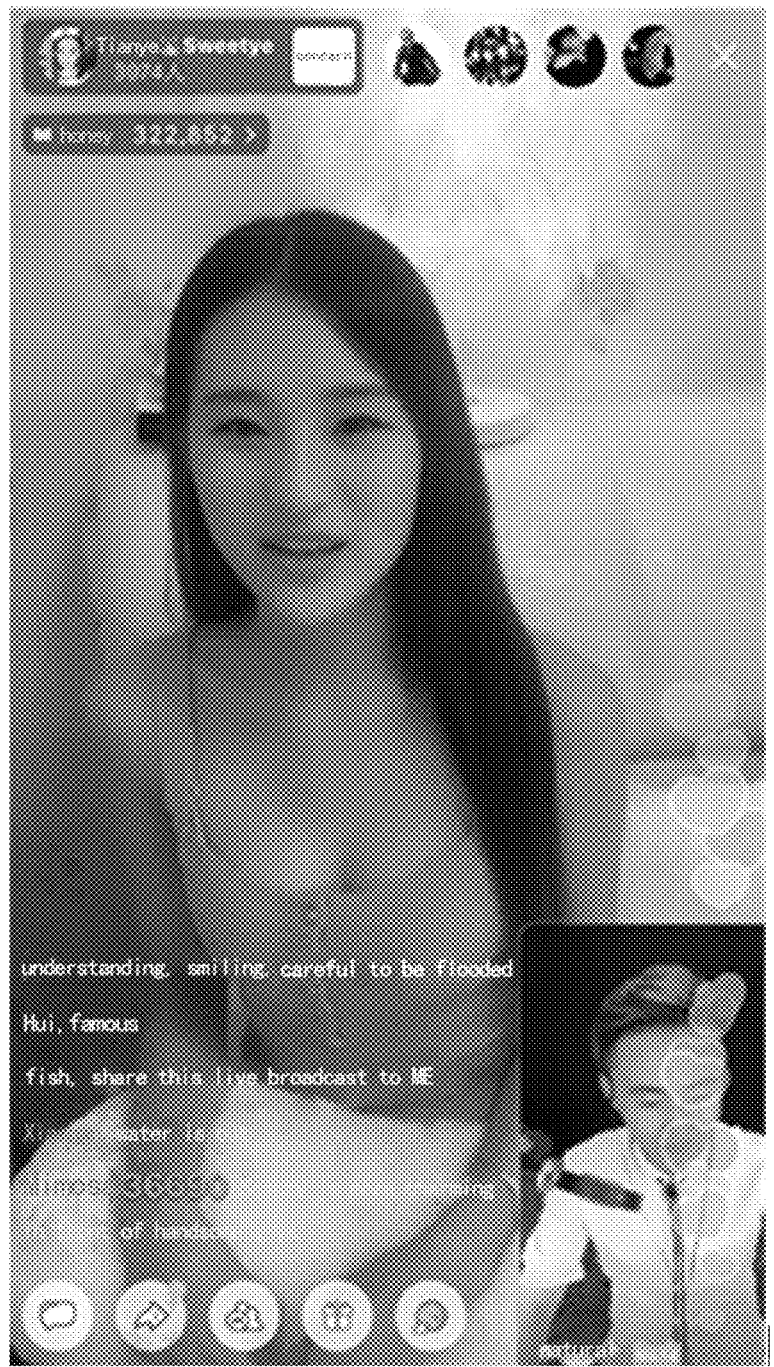
FIG. 2 is a schematic diagram illustrating a combined image before performing face swap based on a face swap method according to an embodiment of the present disclosure.

For example, in the case where the second preset image is displayed in the small window form at a position above the first preset image, when the host terminal and the audience terminal are connected, and after the second preset image of the audience terminal is received, the second preset image and the first preset image may be combined and displayed in the effect shown in FIG. 2 according to the display strategy.

Accordingly, in the audience terminal, only the second preset image may be displayed, or the first preset image and the second preset image may be simultaneously displayed. Then, in an embodiment of the present disclosure, before the face swap prompt is started, the method may further include sending the first preset image to the audience terminal, such that the audience terminal displays the combined image of the first preset image and the second preset image according to a second preset display strategy.

It should be noted that, with the face swap method according to embodiments of the present disclosure, it is achieved that, in the host terminal, the first face image in the first preset image is replaced using the second face image returned by the audience terminal. Similarly, the audience terminal may also achieve face swap using the first face image in the host terminal. That is, in the embodiment of the present disclosure, the method further includes sending the first face image to the audience terminal, such that the audience terminal replaces the second face image with the first face image to obtain a second face-swapped image.

In addition, it can be understood that, when two terminals are connected, for example, the video conversation is established between the two terminals, or the host terminal is connected to another terminal during live broadcast, and when the host terminal and the audience terminal respectively obtain the first face-swapped image and the second face-swapped image, the host terminal may display the first face-swapped image only on the display screen, or display the second face-swapped image only on the display screen, or display first face-swapped image and the second face-swapped image simultaneously on the display screen. Then, in an embodiment of the present disclosure, the method further includes receiving the second face-swapped image from the audience terminal, and displaying a combined image of the first face-swapped image and the second face-swapped image according to a third preset display strategy.

The third preset display strategy is configured to indicate the display manner of the first face-swapped image and the second face-swapped image. For example, the first face-swapped image and the second face-swapped image may be respectively displayed on the left and right sides or the upper and lower sides of the display screen in the same ratio, or the first face-swapped image and the second face-swapped image may be displayed in different ratios, or the second face-swapped image may be displayed in a small window form at a position above the first face-swapped image, or the like.

Figure 3:
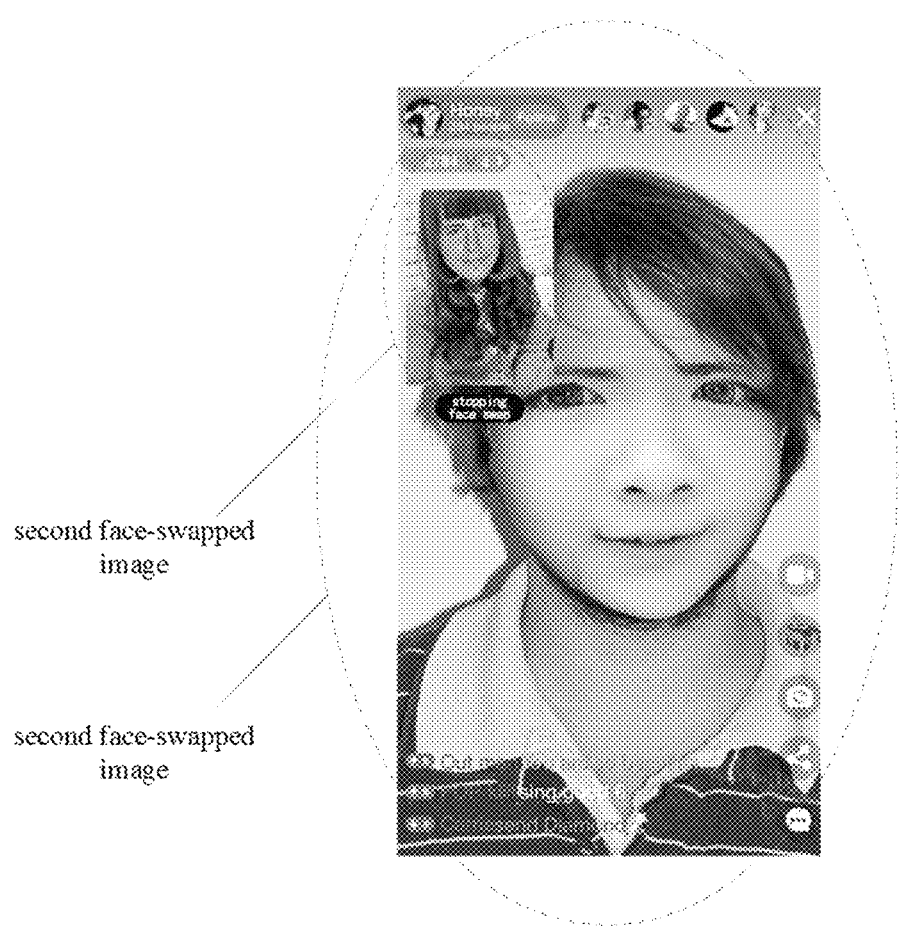
FIG. 3 is a schematic diagram illustrating a combined image after performing face swap based on a face swap method according to an embodiment of the present disclosure.

For example, in the case where the second face-swapped image is displayed in the small window form at a position above the first face-swapped image, when the host terminal and the audience terminal are connected, after the second face-swapped image of the audience terminal is received, the second face-swapped image and the first face-swapped image may be combined and displayed in the effect shown in FIG. 3 according to the display strategy. The third preset display strategy may be the same as or may be different from the first preset display strategy, which is not limited herein.

In addition, when the two terminals are connected during live broadcast, the host terminal may send the combined image of the first preset image and the second preset image, or the first face-swapped image and the second face-swapped image to other users. That is, in an embodiment of the present disclosure, the method may further include sending the combined image to a third terminal connected to the host terminal. In this way, after the host terminal is connected to one of the audience terminals, the host terminal may perform face swap, and push the face-swapped video image to other terminals in real time, the users of the other third parties can view of face swap video of the host and the connected viewer, such that the host can interact with the viewer, other viewers may also see the interaction between the host and the connected viewer, the sense of participation of the viewers can be enhanced, and interestingness of the live video can be improved.

With the face swap method according to embodiments of the present disclosure, the face swap prompt is started, the first face image in the first preset image of the host terminal is recognized and determined, after the second face image sent by the audience terminal is received, the first face image is replaced with the second face image to obtain the first face-swapped image. Thereby, when different terminals are connected, the face images in the difference terminals can be swapped, the application range of face swap technology can be expanded, interestingness and interactivity in the connection process can be enhanced, and the user experience can be improved.

According to the above analysis, when the host terminal and the audience terminal are connected through the network, by interacting with the audience terminal, the first face image in the host terminal and the second face image in the audience terminal can be swapped. The face swap method according to embodiments of the present disclosure will further be described below with reference to FIG. 4, taking the audience terminal as an execution subject.

Figure 4:
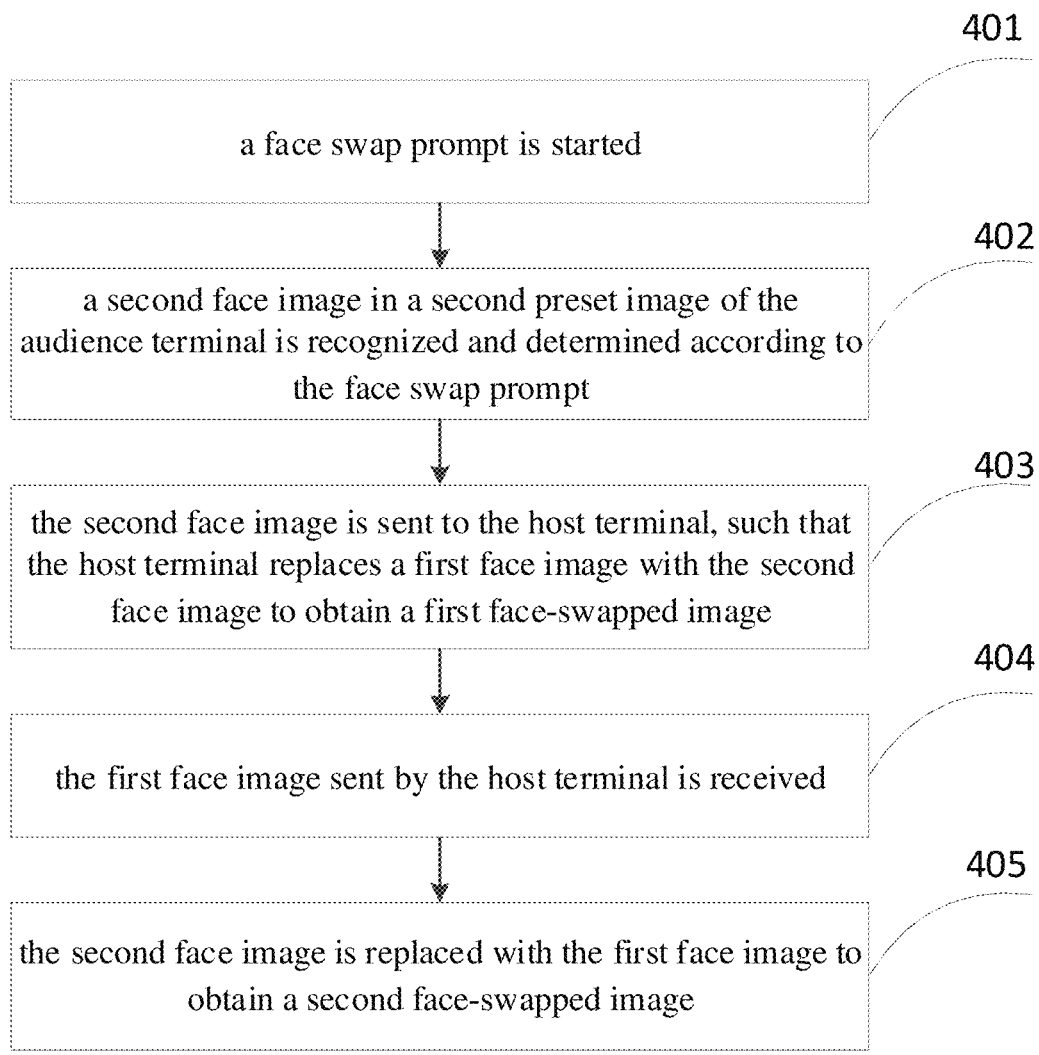
FIG. 4 is a flow chart of a face swap method according to another embodiment of the present disclosure.

FIG. 4 is a flow chart of a face swap method according to another embodiment of the present disclosure.

As shown in FIG. 4, the method may include followings.

At block 401, a face swap prompt is started.

Specifically, the face swap method according to the embodiment of the present disclosure may be configured to be executed in an audience terminal. The audience terminal may be a mobile phone, a computer, or the like.

In the embodiment of the present disclosure, the audience terminal can be connected to the host terminal through the network. Specifically, the audience terminal may be connected to the host terminal for video conversation, or the audience terminal may be connected to the host terminal for live broadcasting, or the like, which is not limited herein.

Specifically, when the audience terminal is connected to the host terminal through the network, the host terminal or the audience terminal can initiate the face swap request, and after the face swap request is agreed, the two parties can automatically start the face swap prompt. In other words, the audience terminal may actively send the face swap request to the host terminal, and start the face swap prompt after the response prompt returned by the host terminal is received. Alternatively, the audience terminal may receive the face swap request sent by the host terminal, and start the face swap prompt after the response message is sent to the host terminal.

It should be further noted that, in the process of the audience terminal sending the face swap request to the host terminal, before the response prompt returned by the host terminal is received, the user may send an operation instruction to the audience terminal to end the face swap operation at any time. Alternatively, after the face swap request sent by the host terminal is received, the audience terminal may not send the response message to the host terminal, but send an end instruction to reject the face swap request of the host terminal.

At block 402, a second face image in a second preset image of the audience terminal is recognized and determined according to the face swap prompt.

At block 403, the second face image is sent to the host terminal, such that the host terminal replaces a first face image with the second face image to obtain a first face-swapped image.

The second preset image may be obtained by the audience terminal through the camera before the face swap prompt is started, or the second preset image may be stored in the local image library, which is not limited herein.

Specifically, after the face swap prompt is started, according to the face swap prompt, the audience terminal can obtain the second face image in the second preset image of the audience terminal through face recognition technology, and send the second face image to the host terminal, such that the host terminal replaces the first face image with the second face image to obtain the first face-swapped image.

It can be understood that, when two terminals are connected, for example, the two terminals are connected for video conversation, or the host terminal is connected to another terminal during live broadcast, before the face swap is performed, the second preset image in the audience terminal may include the second face image, and the first preset image in the host terminal may include the first face image. Similar to the host terminal, the audience terminal may display the second preset image only on the display screen, or may display the first preset image and the second preset image simultaneously on the display screen. Then, in an embodiment of the present disclosure, before the face swap prompt is started, the method may further include obtaining the first preset image of the host terminal, and displaying a combined image of the first preset image and the second preset image according to a second preset display strategy.

The second preset display strategy is configured to indicate the display manner of the first preset image and the second preset image. For example, the first preset image and the second preset image may be respectively displayed on the left and right sides or the upper and lower sides of the display screen in the same ratio, or the first preset image and the second preset image may be displayed in different ratios, or the second preset image may be displayed in a small window form at a position above the first preset image, or the like. The second preset display strategy may be the same as or may be different from the first preset display strategy or the third preset display strategy, which is not limited herein. The implementation process is similar to the process of combining and displaying the first preset image and the second preset image according to the first preset display strategy in the host terminal, and details are not described herein again.

It can be understood that, in order to be similar to the audience terminal, the host terminal may simultaneously display the first preset image and the second preset image on the display screen. In the embodiment, before the face swap prompt is started, the method further includes sending the second preset image to the host terminal, such that the host terminal displays the combined image of the first preset image and the second preset image according to a first preset display strategy.

At block 404, the first face image sent by the host terminal is received.

At block 405, the second face image is replaced with the first face image to obtain a second face-swapped image.

In an implementation, after the first face image sent by the host terminal is received, the audience terminal may replace the second face image in the second preset image with the first face image to obtain the second face-swapped image. The specific face swap manner may be referred to the related art, and will not be described here.

In addition, when two terminals are connected, for example, the two terminals are connected for video conversation, or the host terminal is connected to another terminal during live broadcast, when the host terminal and the audience terminal respectively obtain the first face-swapped image and the second face-swapped image, similar to the host terminal, on the display screen of the audience terminal, the second face-swapped image may be displayed only, or the first face-swapped image may be displayed only, or the first face-swapped image and the second face-swapped image may be simultaneously displayed. Then, in an embodiment of the present disclosure, the method may further include receiving the first face-swapped image from the host terminal, and displaying a combined image of the first face-swapped image and the second face-swapped image according to a fourth preset display strategy.

The fourth preset display strategy is configured to indicate the display manner of the first face-swapped image and the second face-swapped image. For example, the first face-swapped image and the second face-swapped image may be respectively displayed on the left and right sides or the upper and lower sides of the display screen in the same ratio, or the first face-swapped image and the second face-swapped image may be displayed in different ratios, or the second face-swapped image may be displayed in a small window form at a position above the first face-swapped image, or the like. The fourth preset display strategy may be the same as or may be different from the first preset display strategy, the second preset display strategy or the third preset display strategy, which is not limited herein. The implementation process is similar to the process of combining and displaying the first face-swapped image and the second face-swapped image according to the third preset display strategy in the host terminal, and details are not described herein again.

With the face swap method according to embodiments of the present disclosure, the face swap prompt is started, the second face image in the second preset image of the audience terminal is recognized and determined, the second face image is sent to the host terminal, such that the host terminal performs face swap using the second face image, after the audience terminal receives the first face image sent by the host terminal, the audience terminal replaces the second face image with the first face image to obtain the second face-swapped image. Thereby, when different terminals are connected, the face images in the difference terminals can be swapped, the application range of face swap technology can be expanded, interestingness and interactivity in the connection process can be enhanced, and the user experience can be improved.

Figure 5:
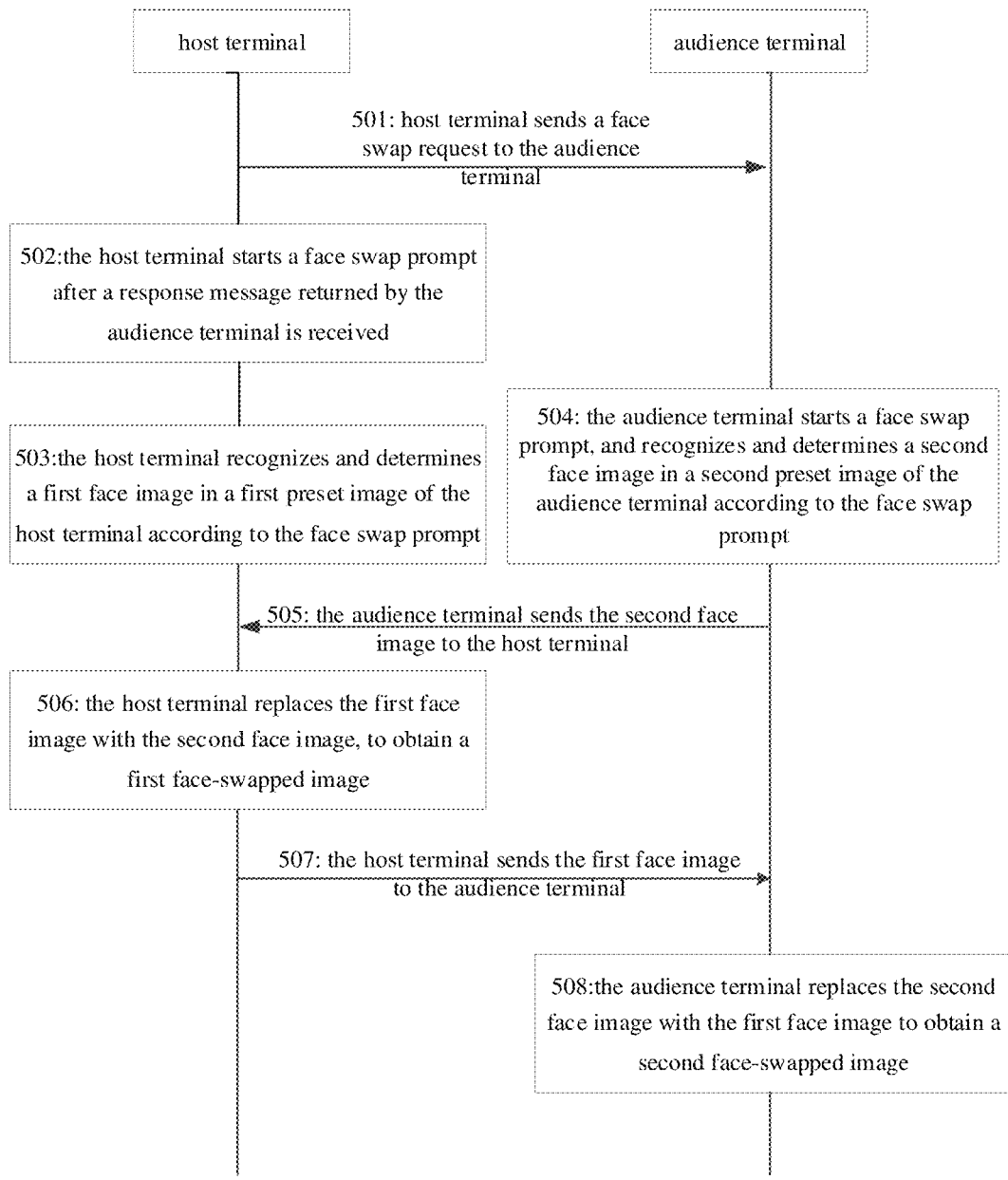
FIG. 5 is a schematic diagram of signaling interaction of a face swap method according to an embodiment of the present disclosure.

FIG. 5 is a schematic diagram of signaling interaction of a face swap method according to an embodiment of the present disclosure.

As illustrated in FIG. 5, the host terminal is connected to the audience terminal through the network, the method may include the followings.

At block 501, the host terminal sends a face swap request to the audience terminal.

At block 502, the host terminal starts a face swap prompt after a response message returned by the audience terminal is received.

At block 503, the host terminal recognizes and determines a first face image in a first preset image of the host terminal according to the face swap prompt.

At block 504, the audience terminal starts a face swap prompt, and recognizes and determines a second face image in a second preset image of the audience terminal according to the face swap prompt.

At block 505, the audience terminal sends the second face image to the host terminal.

At block 506, the host terminal replaces the first face image with the second face image, to obtain a first face-swapped image.

At block 507, the host terminal sends the first face image to the audience terminal.

At block 508, the audience terminal replaces the second face image with the first face image to obtain a second face-swapped image.

It can be understood that, the audience terminal may also send the face swap request to the host terminal, and start the face swap prompt after the response message returned by the host terminal is received, and then according to the face swap prompt, the audience terminal may recognize and determine the second face image in the second preset image of the audience terminal, after the host terminal recognizes and determines the first face image, the audience terminal performs face swap using the first face image sent by the host terminal, and the host terminal performs face swap using the second face image sent by the audience terminal, so as to complete the swapping of the face image.

Through the above process, when the audience terminal and the host terminal are connected through the network, the face images in the two terminals are swapped, such that the application range of face swap technology can be effectively expanded, and interestingness and interactivity in the connection process can be enhanced, and the user experience can be improved.

Figure 6:
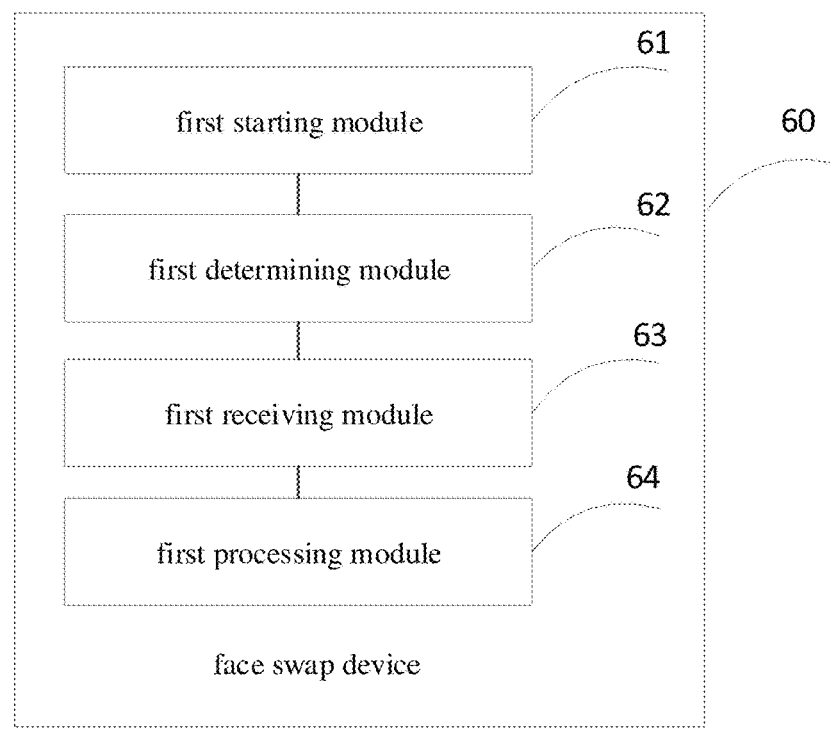
FIG. 6 is a block diagram of a face swap device according to an embodiment of the present disclosure.

FIG. 6 is a block diagram of a face swap device according to an embodiment of the present disclosure.

As illustrated in FIG. 6, the device 60 may be applicable to a host terminal. The device 60 includes a first starting module 61, a first determining module 62, a first receiving module 63, and a first processing module 64.

The first starting module 61 is configured to start a face swap prompt.

The first determining module 62 is configured to recognize and determine a first face image in a first preset image of the host terminal according to the face swap prompt.

The first receiving module 63 is configured to receive a second face image sent by the audience terminal.

The first processing module 64 is configured to replace the first face image with the second face image to obtain a first face-swapped image.

The host terminal may be connected to the audience terminal through the network. In the embodiment, the device may be configured in the host terminal, such as a mobile phone, a computer, or the like.

In a possible implementation manner of the embodiment, the device 60 further includes a first obtaining module, or a second obtaining module.

The first obtaining module is configured to obtain the first preset image by a camera. The second obtaining module is configured to obtain the first preset image from a local image library.

In another possible implementation manner of the embodiment, the device 60 further includes a third obtaining module and a first display module.

The third obtaining module is configured to obtain a second preset image of the audience terminal. The first display module is configured to display a combined image of the first preset image and the second preset image according to a first preset display strategy.

In another possible implementation manner of the embodiment, the device 60 further includes a first sending module. The first sending module is configured to send the first preset image to the audience terminal, such that the audience terminal displays the combined image of the first preset image and the second preset image according to a second preset display strategy.

In another possible implementation manner of the embodiment, the first starting module 61 is configured to send a face swap request to the audience terminal, and start the face swap prompt after receiving a response message returned by the audience terminal; or receive a face swap request from the audience terminal, and start the face swap prompt after sending a response message to the audience terminal.

In another possible implementation manner of the embodiment, the device 60 further includes a second sending module. The second sending module is configured to send the first face image to the audience terminal, such that the audience terminal replaces the second face image with the first face image to obtain a second face-swapped image.

In another possible implementation manner of the embodiment, the device 60 further includes a second receiving module and a second display module.

The second receiving module is configured to receive the second face-swapped image from the audience terminal. The second display module is configured to display a combined image of the first face-swapped image and the second face-swapped image according to a third preset display strategy.

In another possible implementation manner of the embodiment, the device 60 further includes a third sending module. The third sending module is configured to send the combined image to a third terminal connected to the host terminal.

It should be noted that, the explanation of the embodiment of the face swap method performed on the host terminal may also be applicable to the face swap device provided in the embodiment, and details are not described herein again.

With the face swap device according to embodiments of the present disclosure, the face swap prompt is started, the first face image in the first preset image of the host terminal is recognized and determined, after the second face image sent by the audience terminal is received, the first face image is replaced with the second face image to obtain the first face-swapped image. Thereby, when different terminals are connected, the face images in the difference terminals can be swapped, the application range of face swap technology can be expanded, interestingness and interactivity in the connection process can be enhanced, and the user experience can be improved.

Figure 7:
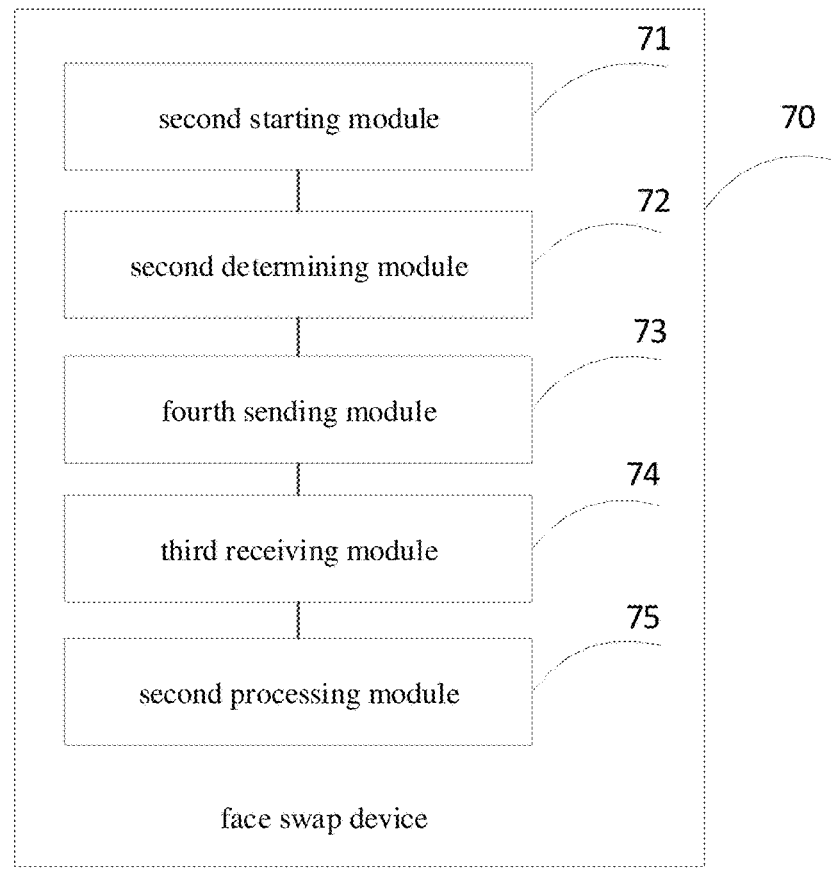
FIG. 7 is a block diagram of a face swap device according to another embodiment of the present disclosure.

FIG. 7 is a block diagram of a face swap device according to another embodiment of the present disclosure.

As illustrated in FIG. 7, the device 70 may be applicable to an audience terminal, and include a second starting module 71, a second determining module 72, a fourth sending module 73, a third receiving module 74 and a second processing module 75.

The second starting module 71 is configured to start a face swap prompt.

The second determining module 72 is configured to recognize and determine a second face image in a second preset image of the audience terminal according to the face swap prompt.

The fourth sending module 73 is configured to send the second face image to the host terminal, such that the host terminal replaces a first face image with the second face image to obtain a first face-swapped image.

The third receiving module 74 is configured to receive the first face image sent by the host terminal.

The second processing module 75 is configured to replace the second face image with the first face image to obtain a second face-swapped image.

In a possible implementation manner of the embodiment, the device 70 further includes a fourth obtaining module. The fourth obtaining module is configured to obtain the second preset image.

In another possible implementation manner of the embodiment, the device further includes a fifth obtaining module, and a third display module.

The fifth obtaining module is configured to obtain the first preset image of the host terminal.

The third display module is configured to display a combined image of the first preset image and the second preset image according to a second preset display strategy.

In another possible implementation manner of the embodiment, the device 70 further includes a fifth sending module. The fifth sending module is configured to send the second preset image to the host terminal, such that the host terminal displays the combined image of the first preset image and the second preset image according to a first preset display strategy.

In another possible implementation manner of the embodiment, the second starting module 71 is configured to send a face swap request to the host terminal, and start the face swap prompt after receiving a response message returned by the host terminal; or receive a face swap request from the host terminal, and start the face swap prompt after sending a response message to the host terminal.

In another possible implementation manner of the embodiment, the device further includes a fourth receiving module, and a fourth display module.

The fourth receiving module is configured to receive the first face-swapped image from the host terminal. The fourth display module is configured to display a combined image of the first face-swapped image and the second face-swapped image according to a fourth preset display strategy.

It should be noted that, the explanation of the embodiment of the face swap method performed on the audience terminal may also be applicable to the face swap device provided in the embodiment, and details are not described herein again.

With the face swap device according to embodiments of the present disclosure, the face swap prompt is started, the second face image in the second preset image of the audience terminal is recognized and determined, the second face image is sent to the host terminal, such that the host terminal performs face swap using the second face image, after the audience terminal receives the first face image sent by the host terminal, the audience terminal replaces the second face image with the first face image to obtain the second face-swapped image. Thereby, when different terminals are connected, the face images in the difference terminals can be swapped, the application range of face swap technology can be expanded, interestingness and interactivity in the connection process can be enhanced, and the user experience can be improved.

Figure 8:
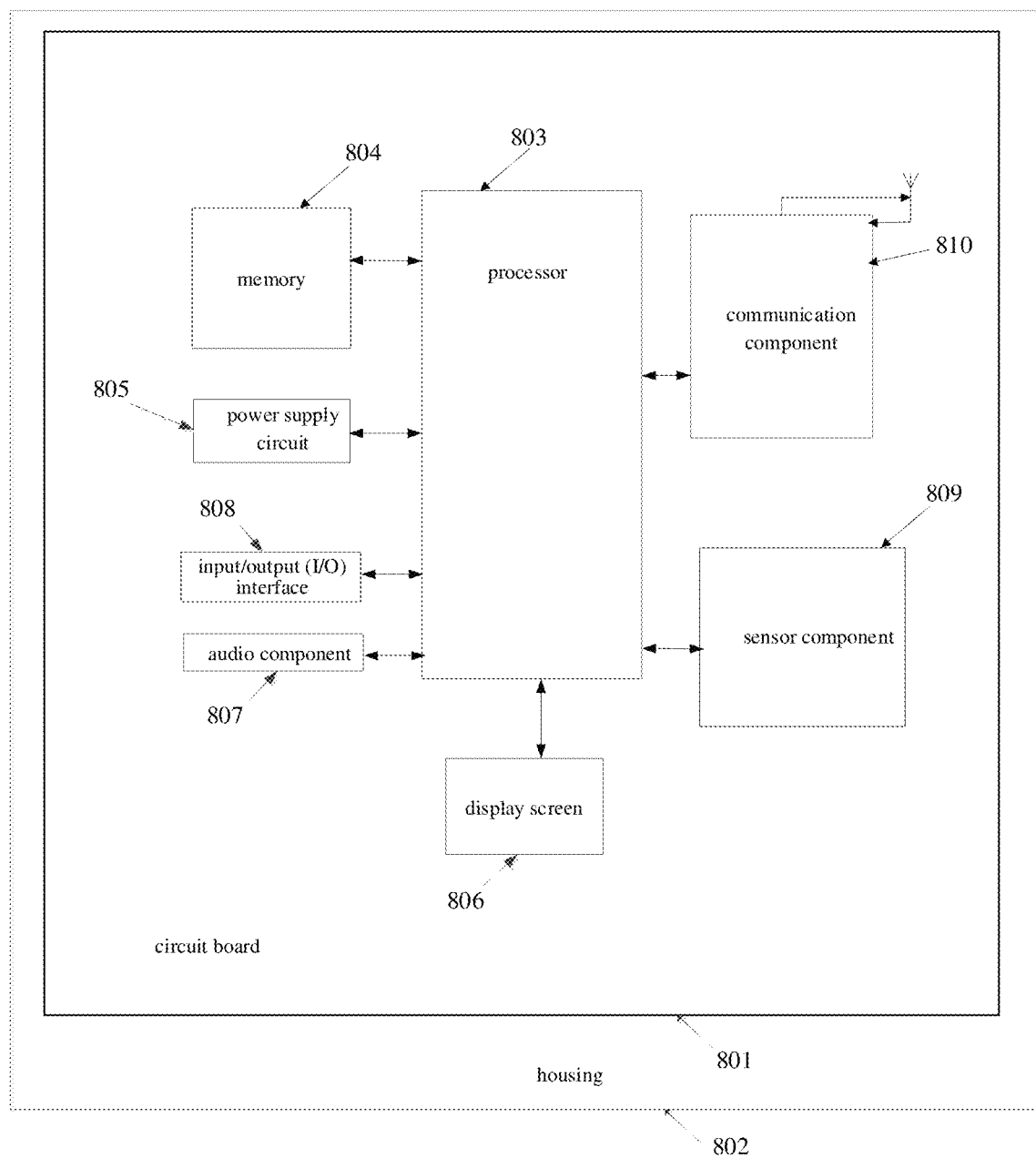
FIG. 8 is a block diagram of a host terminal according to an embodiment of the present disclosure.

FIG. 8 is a block diagram of a host terminal according to an embodiment of the present disclosure.

There may be many types of host terminals, such as mobile phones, palmtop computers, notebook computers, and wearable devices, which are not limited in the embodiment.

As illustrated in FIG. 8, the host terminal includes one or more of the following components: a circuit board 801, a housing 802, a processor 803, a memory 804, a power supply circuit 805, a display screen 806, an audio component 807, and an input/output (I/O) interface 808, a sensor component 809, and a communication component 810. The circuit board 801 is arranged in a space enclosed by the housing 802. The processor 803 and memory 804 are positioned on the circuit board 801. The power supply circuit 805 is configured to provide power for respective circuits or components of the host terminal. The memory 804 is configured to store executable program codes. The processor 803 is configured to run a program corresponding to the executable program codes by reading the executable program codes stored in the memory 804 to perform the face swap method according to embodiments of the present disclosure.

It should be noted that, the foregoing explanation of embodiments of the face swap method performed on the host terminal may also be applicable to the host terminal of the embodiment, the implementation principle is similar, and details are not described herein again.

With the host terminal according to embodiments of the present disclosure, the face swap prompt is started, the first face image in the first preset image of the host terminal is recognized and determined, after the second face image sent by the audience terminal is received, the first face image is replaced with the second face image to obtain the first face-swapped image. Thereby, when different terminals are connected, the face images in the difference terminals can be swapped, the application range of face swap technology can be expanded, interestingness and interactivity in the connection process can be enhanced, and the user experience can be improved.

Figure 9:
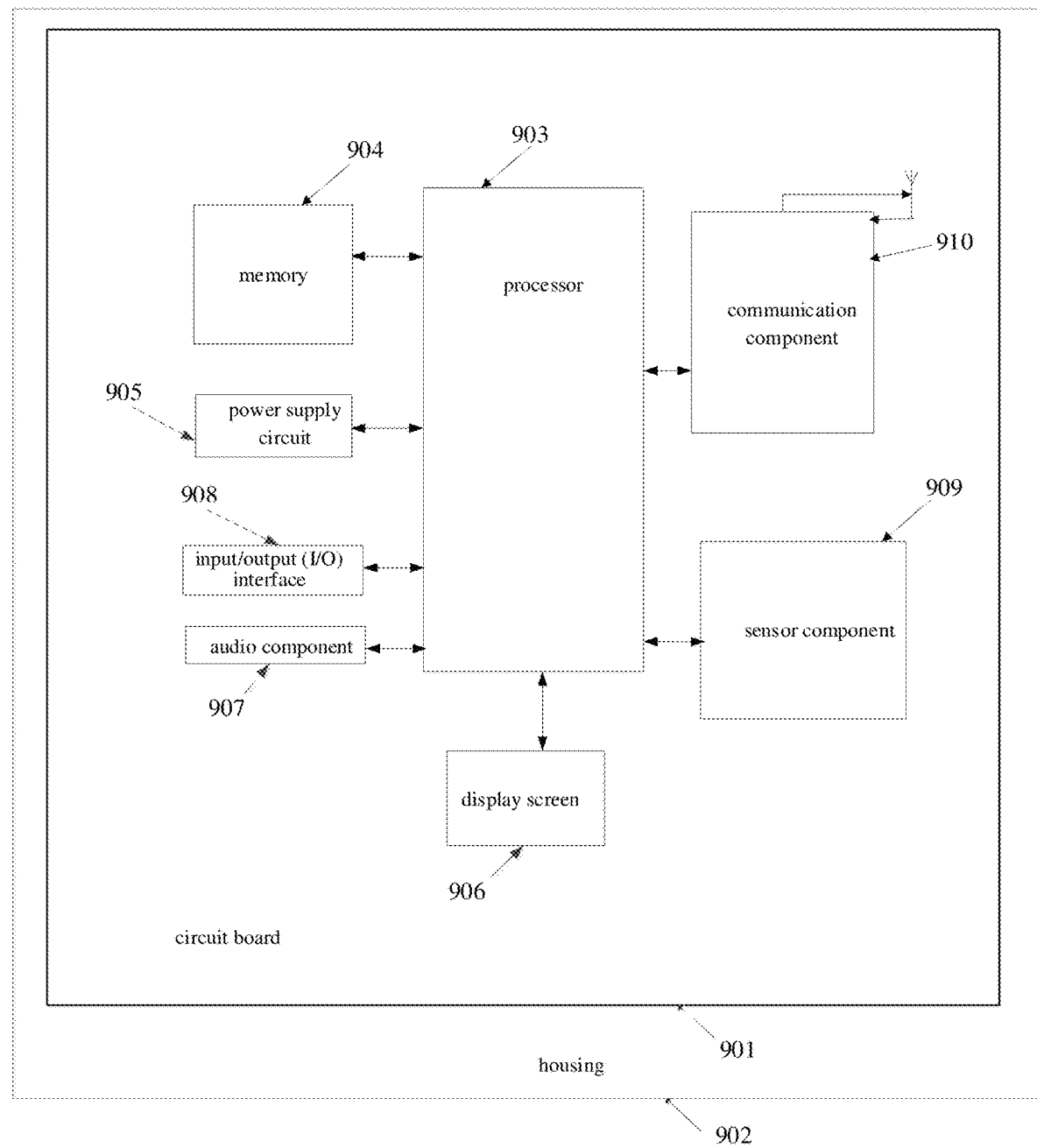
FIG. 9 is a block diagram of an audience terminal according to an embodiment of the present disclosure.

FIG. 9 is a block diagram of an audience terminal according to an embodiment of the present disclosure.

There may be many types of audience terminals, such as mobile phones, palmtop computers, notebook computers, and wearable devices, which are not limited in the embodiment.

As illustrated in FIG. 9, the audience terminal includes one or more of the following components: a circuit board 901, a housing 902, a processor 903, a memory 904, a power supply circuit 905, a display screen 906, an audio component 907, and an input/output (I/O) interface 908, a sensor component 909, and a communication component 910. The circuit board 901 is arranged in a space enclosed by the housing 902. The processor 903 and memory 904 are positioned on the circuit board 901. The power supply circuit 905 is configured to provide power for respective circuits or components of the audience terminal. The memory 904 is configured to store executable program codes. The processor 903 is configured to run a program corresponding to the executable program codes by reading the executable program codes stored in the memory 904 to perform the face swap method according to embodiments of the present disclosure.

It should be noted that, the foregoing explanation of embodiments of the face swap method performed on the audience terminal may also be applicable to the audience terminal of the embodiment, the implementation principle is similar, and details are not described herein again.

With the audience terminal according to embodiments of the present disclosure, the face swap prompt is started, the second face image in the second preset image of the audience terminal is recognized and determined, the second face image is sent to the host terminal, such that the host terminal performs face swap using the second face image, after the audience terminal receives the first face image sent by the host terminal, the audience terminal replaces the second face image with the first face image to obtain the second face-swapped image. Thereby, when different terminals are connected, the face images in the difference terminals can be swapped, the application range of face swap technology can be expanded, interestingness and interactivity in the connection process can be enhanced, and the user experience can be improved.

Based on the face swap method according to various embodiments of the present disclosure, embodiments of another aspect of the present disclosure provide a storage medium for storing executable program codes. When the executable program codes are executed, the face swap method according to embodiments of the present disclosure is implemented.

Embodiments of another aspect of the present disclosure provide a storage medium for storing executable program codes. When the executable program codes are executed, the face swap method according to embodiments of the present disclosure is implemented.

Furthermore, embodiments of another aspect of the present disclosure provide an executable program code. When the executable program code is executed, the face swap method according to embodiments of the present disclosure is implemented.

Furthermore, embodiments of another aspect of the present disclosure provide an executable program code. When the executable program code is executed, the face swap method according to embodiments of the present disclosure is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

It should be illustrated that, in descriptions of the present disclosure, terms such as "first" and "second" are used herein for purposes of description and are not construed as indicating or implying relative importance or significance. Thus, the feature defined with "first" and "second" may comprise one or more this feature. In the descriptions of the present disclosure, unless it is specified otherwise, "a plurality of" means two or more than two, such as two, three, etc.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be included.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A face swap method, applicable to a host terminal, wherein the host terminal is connected to an audience terminal through a network, the method comprises:
   obtaining a first preset image of the host terminal;
   starting a face swap prompt;
   recognizing and determining a first face image in the first preset image according to the face swap prompt;
   receiving a second face image sent by the audience terminal;
   replacing the first face image in the first preset image with the second face image to obtain a first face-swapped image;
   sending the first face image to the audience terminal, such that the audience terminal replaces the second face image with the first face image to obtain a second face-swapped image;
   receiving the second face-swapped image from the audience terminal; and
   displaying a combined image of the first face-swapped image and the second face-swapped image according to a third preset display strategy.

2. The method according to claim 1, wherein before starting the face swap prompt, the method further comprises:
   obtaining the first preset image by a camera; or
   obtaining the first preset image from a local image library.

3. The method according to claim 2, wherein before starting the face swap prompt, the method further comprises:
   obtaining a second preset image of the audience terminal; and displaying a combined image of the first preset image and the second preset image according to a first preset display strategy.

4. The method according to claim 3, wherein before starting the face swap prompt, the method further comprises:
sending the first preset image to the audience terminal, such that the audience terminal displays the combined image of the first preset image and the second preset image according to a second preset display strategy.

5. The method according to claim 1, wherein starting the face swap prompt comprises:
sending a face swap request to the audience terminal, and starting the face swap prompt after receiving a response message returned by the audience terminal; or
receiving a face swap request from the audience terminal, and starting the face swap prompt after sending a response message to the audience terminal.

6. The method according to claim 3, further comprising:
sending the combined image of the first preset image and the second preset image and the combined image of the first face-swapped image and the second face-swapped image to a third terminal connected to the host terminal.

7. A face swap method, applicable to an audience terminal, wherein the audience terminal is connected to a host terminal through a network, the method comprises:
obtaining a second preset image of the audience terminal;
starting a face swap prompt;
recognizing and determining a second face image in the second preset image according to the face swap prompt;
sending the second face image to the host terminal, such that the host terminal replaces a first face image in a first preset image of the host terminal with the second face image to obtain a first face-swapped image;
receiving the first face image sent by the host terminal;
replacing the second face image in the second preset image with the first face image to obtain a second face-swapped image;
receiving the first face-swapped image from the host terminal; and
displaying a combined image of the first face-swapped image and the second face-swapped image according to a fourth preset display strategy.

8. The method according to claim 7, wherein before starting the face swap prompt, the method further comprises:
obtaining the first preset image of the host terminal; and
displaying a combined image of the first preset image and the second preset image according to a second preset display strategy.

9. The method according to claim 8, wherein before starting the face swap prompt, the method further comprises:
sending the second preset image to the host terminal, such that the host terminal displays the combined image of the first preset image and the second preset image according to a first preset display strategy.

10. The method according to claim 7, wherein starting the face swap prompt comprises:
sending a face swap request to the host terminal, and starting the face swap prompt after receiving a response message returned by the host terminal; or
receiving a face swap request from the host terminal, and starting the face swap prompt after sending a response message to the host terminal.

11. A host terminal, connected to an audience terminal through a network, comprising:
a processor; and
a memory, configured to store executable program codes;
wherein the processor is configured to run a program corresponding to the executable program codes by reading the executable program codes stored in the memory to:
obtain a first preset image of the host terminal;
start a face swap prompt;
recognize and determine a first face image in the first preset image according to the face swap prompt;
receive a second face image sent by the audience terminal;
replace the first face image in the first preset image with the second face image to obtain a first face-swapped image;
send the first face image to the audience terminal, such that the audience terminal replaces the second face image with the first face image to obtain a second face-swapped image;
receive the second face-swapped image from the audience terminal; and
display a combined image of the first face-swapped image and the second face-swapped image according to a third preset display strategy.

12. The host terminal according to claim 11, wherein the processor is further configured to:
obtain the first preset image by a camera; or
obtain the first preset image from a local image library.

13. The host terminal according to claim 12, wherein the processor is further configured to:
obtain a second preset image of the audience terminal;
display a combined image of the first preset image and the second preset image according to a first preset display strategy; and
send the first preset image to the audience terminal, such that the audience terminal displays the combined image of the first preset image and the second preset image according to a second preset display strategy.

14. The host terminal according to claim 13, wherein the processor is further configured to:
send the combined image of the first preset image and the second preset image and the combined image of the first face-swapped image and the second face-swapped image to a third terminal connected to the host terminal.

15. The host terminal according to claim 11, wherein when the processor is configured to start a face swap prompt, the processor is configured to:
send a face swap request to the audience terminal, and start the face swap prompt after receiving a response message returned by the audience terminal; or
receive a face swap request from the audience terminal, and start the face swap prompt after sending a response message to the audience terminal.

* * * * *